United States Patent [19]

Fujita et al.

[11] Patent Number: 5,140,490
[45] Date of Patent: Aug. 18, 1992

[54] SHUTTER FOR A CARTRIDGE CASE

[75] Inventors: Minoru Fujita, Toride; Kazuya Fukunaga; Masaru Yoshida, both of Ibaraki, all of Japan

[73] Assignee: Hitachi Maxell, Ltd., Osaka, Japan

[21] Appl. No.: 671,943

[22] Filed: Mar. 19, 1991

[30] Foreign Application Priority Data

Mar. 20, 1990 [JP] Japan ................................ 2-68270

[51] Int. Cl.⁵ .................................................. G11B 23/03
[52] U.S. Cl. ........................................ 360/132; 369/291
[58] Field of Search ............................... 360/133; 369/291

[56] References Cited

U.S. PATENT DOCUMENTS

| 4,682,260 | 7/1987 | Oishi et al. ............................ 360/133 |
| 5,036,421 | 7/1991 | Kaneda et al. ....................... 360/133 |
| 5,084,862 | 1/1992 | Fujita et al. .......................... 369/291 |

FOREIGN PATENT DOCUMENTS 0353000 1/1990 European Pat. Off. .

OTHER PUBLICATIONS

Patent Abstracts of Japan, vol. 12, No. 345 (P-759) (3192) 16 Sep. 1988, and JP-A-63 103484 (Hitachi Maxell Ltd.) 9 May 1988, abstract only.
Patent Abstracts of Japan, vol. 12, No. 123 (P-690) (2970) 16 Apr. 1988, and JP-A-62 248181 (Hitachi Maxell Ltd.) 29 Oct. 1987, abstract only.

Primary Examiner—John H. Wolff
Attorney, Agent, or Firm—Birch, Stewart, Kolasch & Birch

[57] ABSTRACT

A shutter for a cartridge is adapted to be mounted on a cartridge case of the cartridge so as to open and close a head insertion hole in the cartridge case housing a recording medium therein the shutter being made of a synthetic resin and includes a pair of opposed flat plate portions and a connecting plate portion interconnecting the pair of flat plate portions at proximal edges of the flat plate portions, the thickness of each of the flat plate portions increases progressively from the proximal edge thereof, disposed adjacent to the connecting plate portion, toward the other distal edge of the flat plate portion remote from the connecting plate portion and an apparatus for molding this shutter.

4 Claims, 9 Drawing Sheets

SHUTTER FOR A CARTRIDGE CASE

BACKGROUND OF THE INVENTION

This invention relates to a shutter for a cartridge, such as a magnetic disk cartridge, an optical disk cartridge and a magnetic tape cartridge, and also to an apparatus for molding such a shutter. More particularly, the invention relates to the thickness of a flat plate portion of the shutter and to the construction of the mold for molding this flat plate portion.

FIG. 1 is a perspective view of a magnetic disk cartridge, FIG. 2 is a cross-sectional view taken along the line II—II of FIG. 1, and FIG. 3 is a perspective view of a shutter used in the magnetic disk cartridge.

A flexible magnetic disk 2 is rotatably housed within a cartridge case 1 composed of an upper case member 1a and a lower case member 1b (see FIG. 2) connected together. A pair of recesses 3 are formed respectively in opposite sides of the front portion of the cartridge case 1, and a magnetic head insertion hole 4 is formed in a generally central portion of the recessed portion 3. A shutter 5 for selectively opening and closing the magnetic head insertion hole 4 is slidably supported on the recessed portion 3.

The shutter 5 is made of either metal or a synthetic resin. In the case of the metal shutter 5, the edges of the shutter 5 grind or cut the sliding surface of the recessed portion 3 during the sliding movement of the shutter 5, so that powder of a synthetic resin is produced by such grinding. This synthetic resin powder adheres to the magnetic disk 2, so that an error is liable to occur during the recording and reproduction. In an attempt to prevent this, if a large clearance is provided between the cartridge case 1 and the shutter 5, foreign matter such as dirt is liable to intrude into the cartridge case 1 from the surroundings of the shutter 5. As a result, such foreign matter adheres to the magnetic disk, so that an error is also caused during recording and reproduction.

On the other hand, the synthetic resin shutter 5, unlike the metal shutter, is free from the problem that the surface of the recessed portion 3 is ground. Therefore, the shutter 5 can be disposed in resilient, close contact with the surface of the cartridge case 1, i.e., the recessed portion 3, thereby effectively preventing foreign matter, such as dirt, from intruding into the cartridge case 1 from the surroundings of the shutter 5.

As shown in FIGS. 2 and 3, the synthetic resin shutter 5 is comprised mainly of a pair of opposed flat plate portions 6 and a connecting plate portion 7 interconnecting the two flat plate portions 6 at their one end edges. The synthetic resin shutter 5 has a generally U-shape as viewed from the side thereof. Each flat plate portion 6 has an opening 8 of generally the same size as that of the magnetic head insertion hole 4, and a closure portion 9 for closing the magnetic head insertion hole 4. As shown in FIG. 1, this shutter 5 is normally urged resiliently by a spring (not shown) in such a direction that the closure portion 9 closes the magnetic head insertion hole 4.

Key-shaped projections 10 are formed on the inner surface of the connecting plate portion 7. As shown in FIG. 2, the key-shaped projections 10 are engaged in a guide groove 11 provided inside the cartridge case 1, thereby preventing the shutter 5 from being disengaged from the cartridge case 1 during the sliding movement of the shutter 5. Openings 12 are formed through those portions of the flat plate portions 6 opposed to proximal portions 10a of the projections 10. The openings 12 are formed when releasing a mold.

In the conventional shutter 5, particular consideration has not been given to the thickness of the flat plate portion 6, and the flat plate portion 6 has a uniform thickness as a whole.

On the other hand, in view of the uniformity of flow of the resin, a gate for injection-molding the shutter 5 is usually disposed at a position corresponding to the end edge of the connecting plate portion 7. Therefore, when the shutter 5 is actually injection-molded, the flow of the resin is worse at the free end portion of the flat plate portion 6 remote from the connecting plate portion 7, so that a short shot or a void tends to occur at the free end portion of the flat plate portion 6 whereas the flat plate portion 6 becomes thicker at its proximal end portion close to the gate, so that burrs may be formed on this proximal end portion. Particularly, with respect to the type of cartridge in which the flat plate portion 6 is quite thin, on the order of about 0.35 mm, as in a 3.5-inch magnetic disk cartridge, or with respect to the type of cartridge in which a flat plate portion is so long (in a direction perpendicular to the direction of sliding movement of the shutter), as to close both a head insertion hole and a drive shaft insertion hole as in an optical disk cartridge, the above-mentioned short shot and void tend to develop at the free end portion of the flat plate portion 6. Thus, in the prior art, a defective molding of the shutter 5 has been liable to occur, which affects the productivity.

FIG. 15 is a plan view of a portion of a magnetic disk cartridge employing a conventional shutter 5 of a synthetic resin. As shown in FIG. 15, a notch 13 for opening the shutter 5 is provided at the front face of a cartridge case 1. When the magnetic disk cartridge is inserted into a recording and reproducing device, a distal end of a shutter-opening member 14 provided on the recording and reproducing device is inserted in the notch 13, and is engaged with the side edge of the shutter 5, disposed in its closed position, to urge the shutter 5 to be automatically opened in a direction of the arrow in response to the insertion of the magnetic disk cartridge.

On the other hand, a gate trace 15 is formed at that end of the conventional shutter 5 close to the opening 8, and the gate trace 15 of a tapered shape is projected from the end of the shutter 5. Therefore, the shutter 5 and the shutter opening member 14 fail to positively engage each other, and in some cases the shutter opening member 14 is not engaged with the shutter 5, but slides over the shutter 5. Thus, the problem of operation reliability has been encountered.

SUMMARY OF THE INVENTION

With the above deficiencies of the prior art in mind, it is an object of this invention to provide a shutter for a cartridge which can be efficiently molded on a mass-production basis without any molding defect.

Another object of the invention is to provide apparatus for molding such a shutter.

According to one aspect of the present invention, there is provided a shutter for a cartridge which is adapted to be mounted on a cartridge case of the cartridge so as to open and close a head insertion hole in the cartridge case housing a recording medium therein, the shutter being made of a synthetic resin and including a pair of opposed flat plate portions and a connecting plate portion interconnecting the pair of flat plate portions at their edges at of the flat plate portions, wherein the thickness of each of the flat plate portions increases progressively from the edge at the one end thereof, disposed adjacent to the connecting plate portion, toward the other end edge of the flat plate portion remote from the connecting plate portion.

According to another aspect of the invention, there is provided an apparatus for molding a shutter for a cartridge which is adapted to be mounted on a cartridge case of the cartridge so as to open and close a head insertion hole in the cartridge case housing a recording medium therein, the shutter being made of a synthetic resin and including a pair of opposed flat plate portions and a connecting plate portion interconnecting the pair of flat plate portions at the edges of the one end of the flat plate portions, the apparatus comprising a mold for forming a cavity which has a pair of flat plate portion-forming spaces for forming the pair of flat plate portions, respectively, and a connecting plate portion-forming space for forming the connecting plate portion, wherein the depth of each of the flat plate portion-forming spaces increases progressively from its proximal end, disposed close to the connecting plate portion-forming space, toward its distal end remote from the connecting plate portion-forming space.

In the present invention, as described above, the thickness T of each flat plate portion increases progressively from the edge of its proximal end (whose thickness is indicated by T1), disposed adjacent to the connecting plate portion, toward its free or distal end edge (whose thickness is indicated by T2) (T1<T2), remote from the connecting plate portion. With this construction, the flow of the resin over the entire area of the flat plate portion is uniform so as to prevent a short shot or a void from developing at the free end portion of the flat plate portion, thereby ensuring a good moldability.

DETAILED DESCRIPTION OF THE PREFERRED EMBODIMENTS

A preferred embodiment of the invention will now be described with reference to the drawings.

Figure 1:
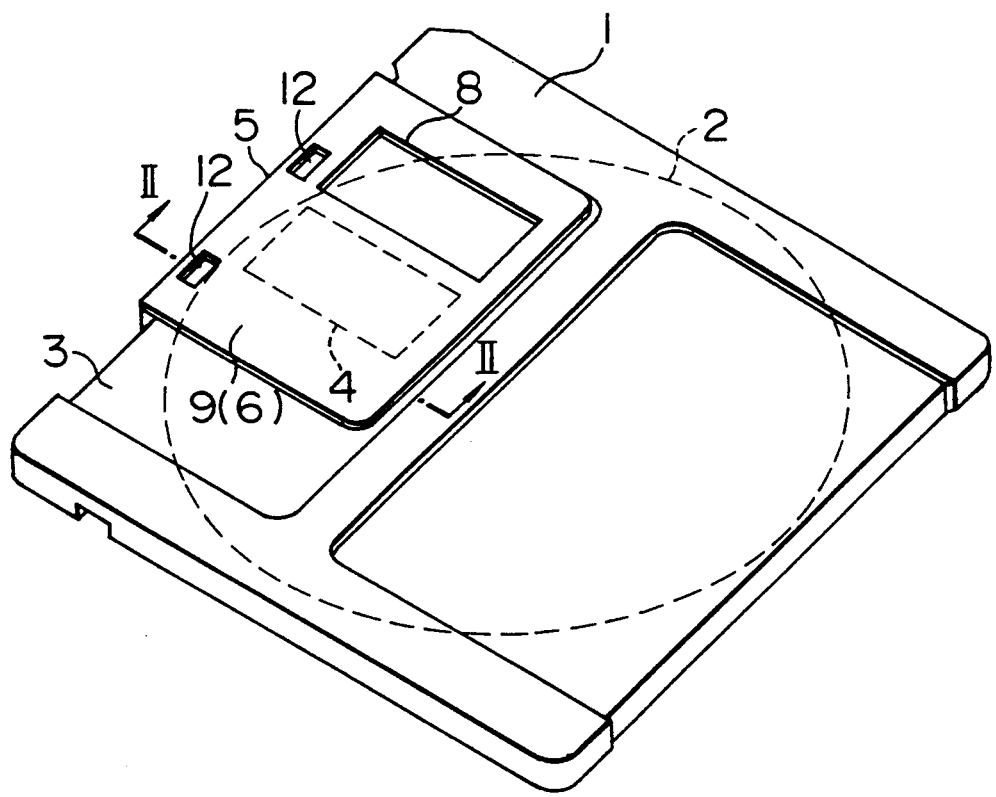
FIG. 1 is a perspective view of a magnetic disk cartridge.
Figure 2:
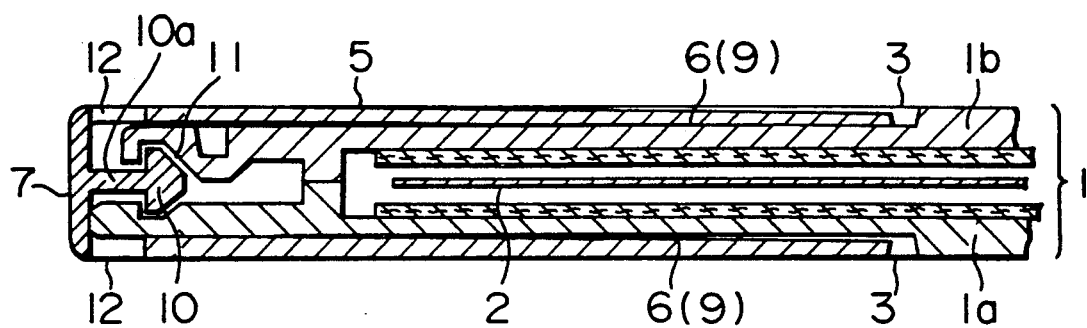
FIG. 2 is a cross-sectional view taken along the line II—II of FIG. 1.
Figure 3:
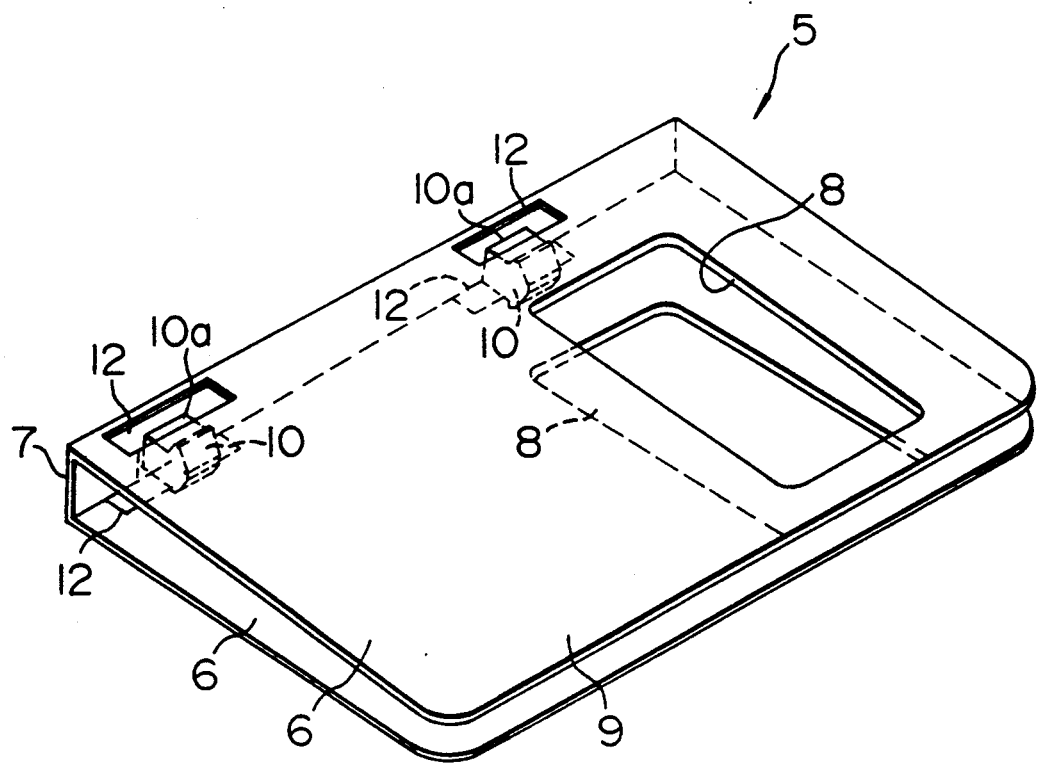
FIG. 3 is a perspective view of a shutter used in the magnetic disk cartridge.
Figure 4:
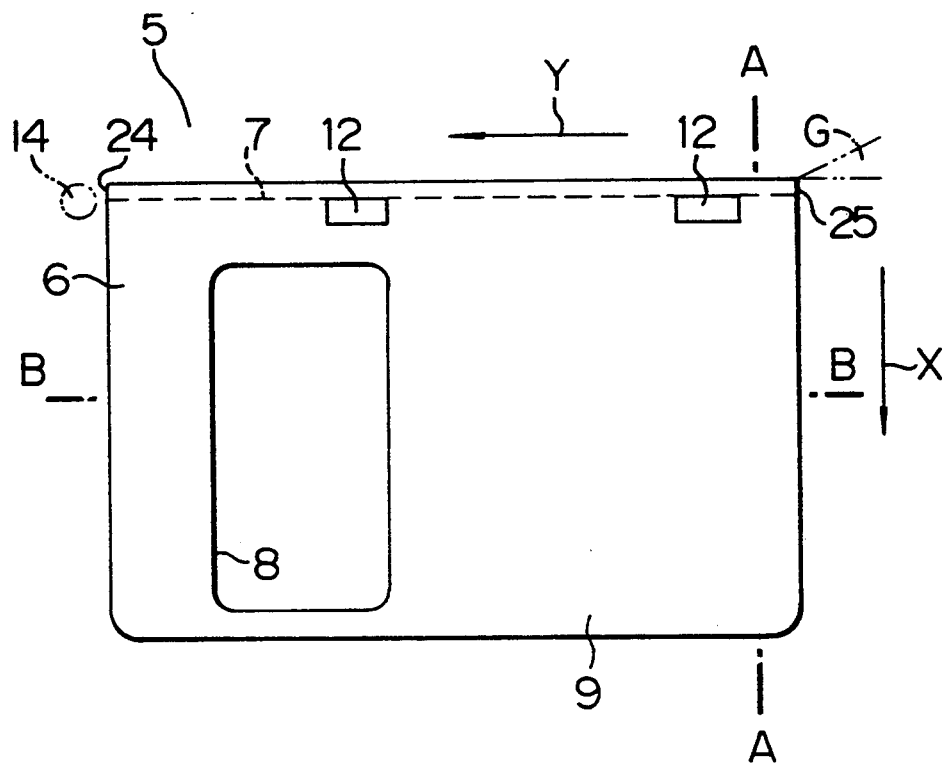
FIG. 4 is a plan view of a shutter provided in accordance with the present invention.
Figure 5:
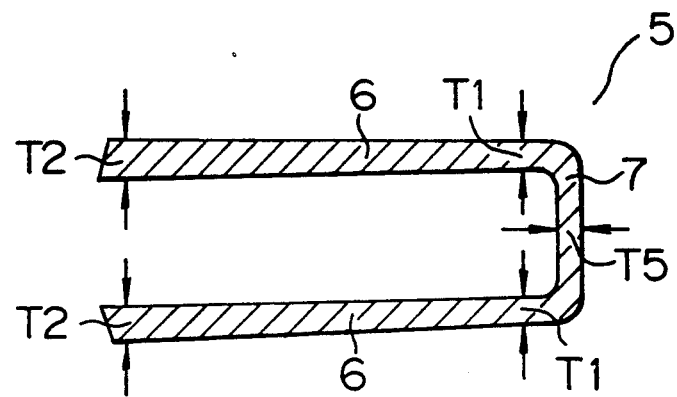
FIG. 5 is a cross-sectional view taken along the line A—A of FIG. 4.
Figure 6:
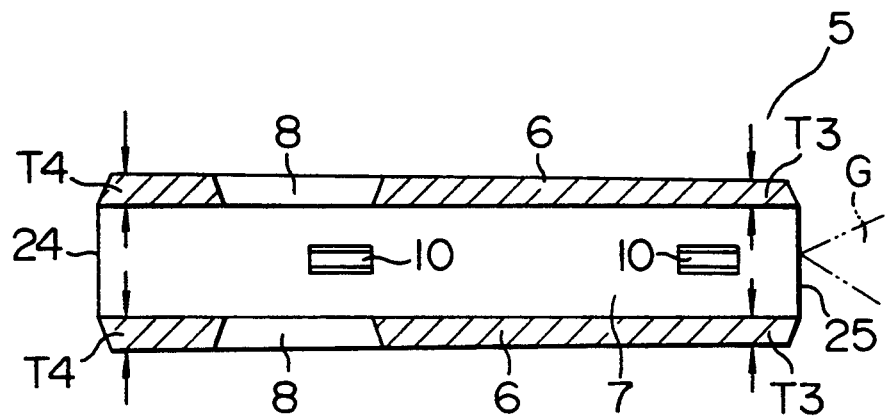
FIG. 6 is a cross-sectional view taken along the line B—B of FIG. 4.

As a molding material for the shutter 5, there is used a synthetic resin such as copolymer polyacetal, homopolymer polyacetal, polypropylene, a polymer alloy of polypropylene and polyamide and an ABS resin. As shown in FIGS. 4 to 6, the shutter 5 is comprised mainly of a pair of opposed flat plate portions 6 and a connecting plate portion 7 interconnecting the two flat plate portions 6 at their proximal end edges. The shutter 5 has a generally U-shape as viewed from the side of the shutter 5 (see FIG. 5). As shown in FIG. 4, each of the flat plate portions 6 has an opening 8 generally equal in size to a magnetic head insertion hole 4, and a closure portion 9 for closing the magnetic head insertion hole 4. As shown in FIG. 6, two key-shaped projections 10 are formed on the inner surface of the connecting plate portion 7, and are spaced a predetermined distance from each other. The key-shaped projections 10 are engaged in a guide groove 11 provided inside a cartridge case 1 (see FIG. 2). Openings 12 are formed through those portions of the flat plate portions 6 opposed to the proximal portions of the projections 10 (see FIG. 4). The openings 12 are formed when releasing a mold.

As shown in FIG. 4, a gate G for injection molding the shutter 5 is positioned adjacent only to a second end edge 25 of the connecting plate portion 7 remote from a first end edge 24 of the connecting plate portion 7 with which a shutter opening member 14 of a recording and reproducing device is engageable. By disposing the one-point gate at such a position, even if a burr-like gate trace is formed, it will not be engaged with the shutter opening member 14.

Reference is now made to the thickness T of the flat plate portion 6. As shown in FIG. 5, the thickness T of each flat plate portion 6 increases progressively from its proximal end edge (whose thickness is indicated by T1), disposed adjacent to the connecting plate portion 7, toward its free or distal end edge (whose thickness is indicated by T2) (T1<T2) remote from the connecting plate portion 7. In contrast with the prior art, the thickness T1 is equal to or greater than the thickness T5 of the connecting plate portion 7 (T1≧T5).

Also, as shown in FIG. 6, the thickness of the flat plate portion 6 increases progressively from its one side edge (whose thickness is indicated by T3) close to the gate trace (the gate G) toward the other side edge thereof (whose thickness is indicated by T4) remote from the gate trace (the gate G) (T3<T4). Namely, the thickness of the flat plate portion 6 increases progressively from the gate trace (the gate G) both in the direction of arrow X and in the direction of arrow Y. The rate of increase of the thickness T2 relative to the thickness T1, as well as the rate of increase of the thickness T4 relative to the thickness T3, is 1 to 15%, and preferably 2 to 10%.

The injection molding apparatus for molding the shutter 5 will now be described with reference to FIGS. 7 to 11.

Figure 9:
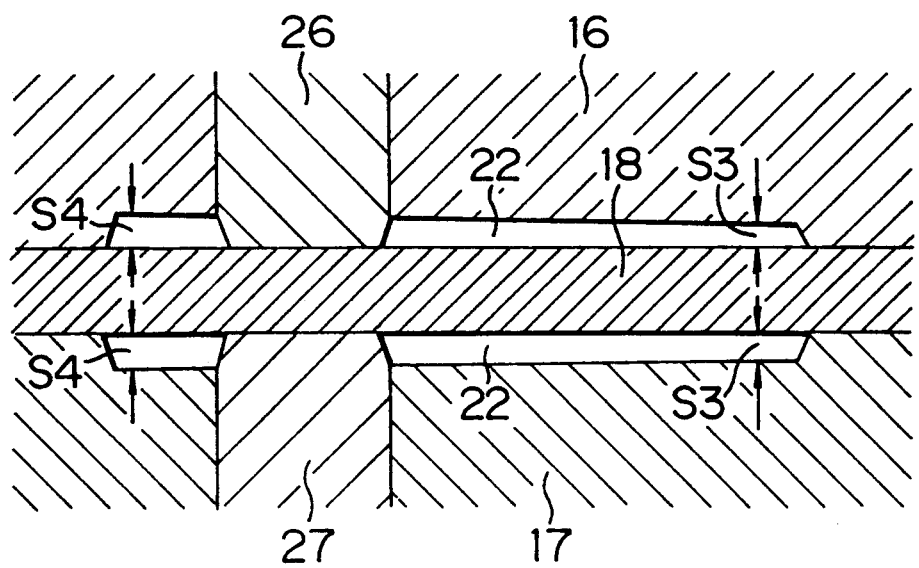

In these Figures, reference numeral 16 denotes a fixed mold member, and reference numeral 17 denotes a movable mold member, and reference numeral 18 denotes a slide core disposed between the fixed and movable mold members 16 and 17, with a predetermined gap provided between the slide core 18 and each of the fixed and movable mold members 16 and 17. The slide core 18 is caused by an angular pin or a pneumatic cylinder (not shown) to slide when the mold is to be opened. Reference numeral 19 denotes a fixed-side projection contour-forming portion provided on the fixed mold member 16 and extending toward the movable mold member 17. Reference numeral 20 denotes a movable-side projection contour-forming portion provided on the movable mold member 17 in opposed relation to the fixed-side projection contour-forming portion 19. For example, two pairs of fixed-side projection contour-forming portion and movable-side projection contour-forming portion 19 and 20 are provided and spaced at a predetermined interval in a direction perpendicular to the sheet of FIG. 7. Reference numeral 21 denotes a runner block. As shown in FIG. 9, a fixed-side head insertion opening contour-forming portion 26 is provided on the fixed mold member 16, and extends toward the slide core 18, and a movable-side head insertion opening contour-forming portion 27 is provided on the movable mold member 17, and extends toward the slide core 18.

Figure 7:
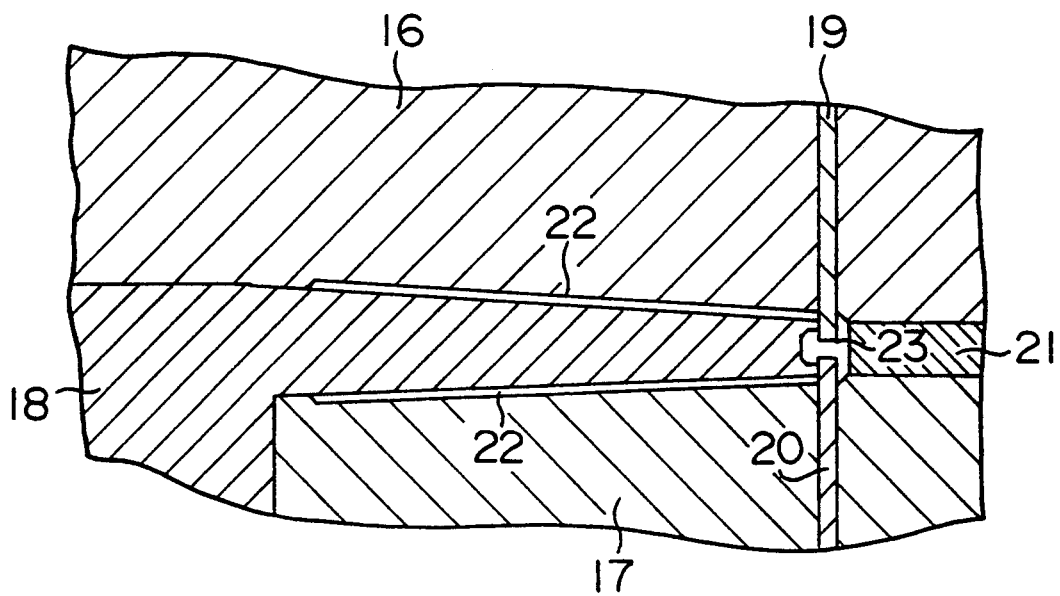
FIG. 7 is a cross-sectional view of a portion of an injection molding apparatus for molding the shutter of FIG. 4, the molding apparatus being shown in its closed condition prior to the filling of a synthetic resin therein.
Figure 8:
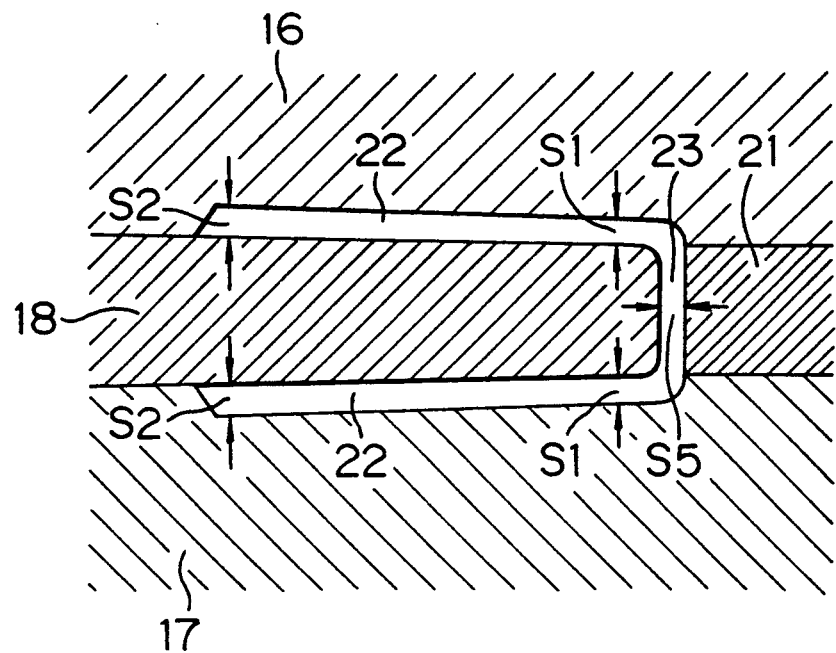
FIGS. 8 and 9 are fragmentary, cross-sectional views of the injection molding apparatus, showing respectively those portions of its mold for molding those portions of the shutter shown respectively in FIGS. 5 and 6, the molding apparatus being shown in its closed condition prior to the filling of the synthetic resin therein.

As shown in FIGS. 7 to 9, in the mold-closed condition prior to the filling of the resin, a relatively narrow flat plate portion-forming space 22 is formed between the fixed mold member 16 and the slide core 18, and similarly another relatively narrow flat plate portion-forming space 22 is formed between the movable mold member 17 and the slide core 18. A connecting plate portion (projection)-forming space 23 is defined by the fixed mold member 16, the movable slide member 17, the slide core 18, the fixed-side projection contour forming-portion 19 and the movable-side projection contour-forming portion 20.

In order that the thickness T of each flat plate portion 6 can be progressively changed in the manner described above, as shown in FIGS. 8 and 9, the depth S of the flat plate portion-forming space 22 increases progressively from its proximal end (whose depth is indicated by S1), disposed close to the connecting plate portion-forming space 23, toward its distal end (whose depth is indicated by S2) remote from the connecting plate portion-forming space 23 (S1<S2) (see FIG. 8). The depth S1 is equal to or greater than the depth S5 of the connecting plate portion-forming space 23 (S1≧S5) (see FIG. 8).

Figure 10:
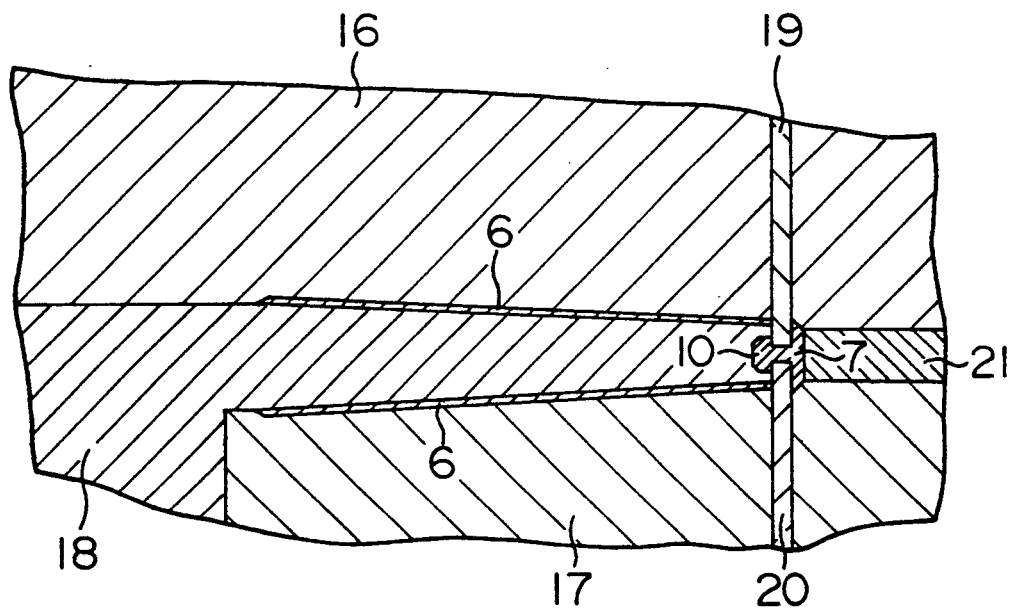
FIG. 10 is a view similar to FIG. 7, but showing the synthetic resin filled in the injection molding apparatus.

After the resin is filled in the mold, the resin is cured or set. This condition is shown in FIG. 10. One of the two flat plate portions 6 is formed by the resin filled in one of the two spaces 22 whereas the other flat plate portion 6 is formed by the resin filled in the other space 22. The proximal portions 10a of the projections 10 are formed by the resin filled in the space 23.

Figure 11:
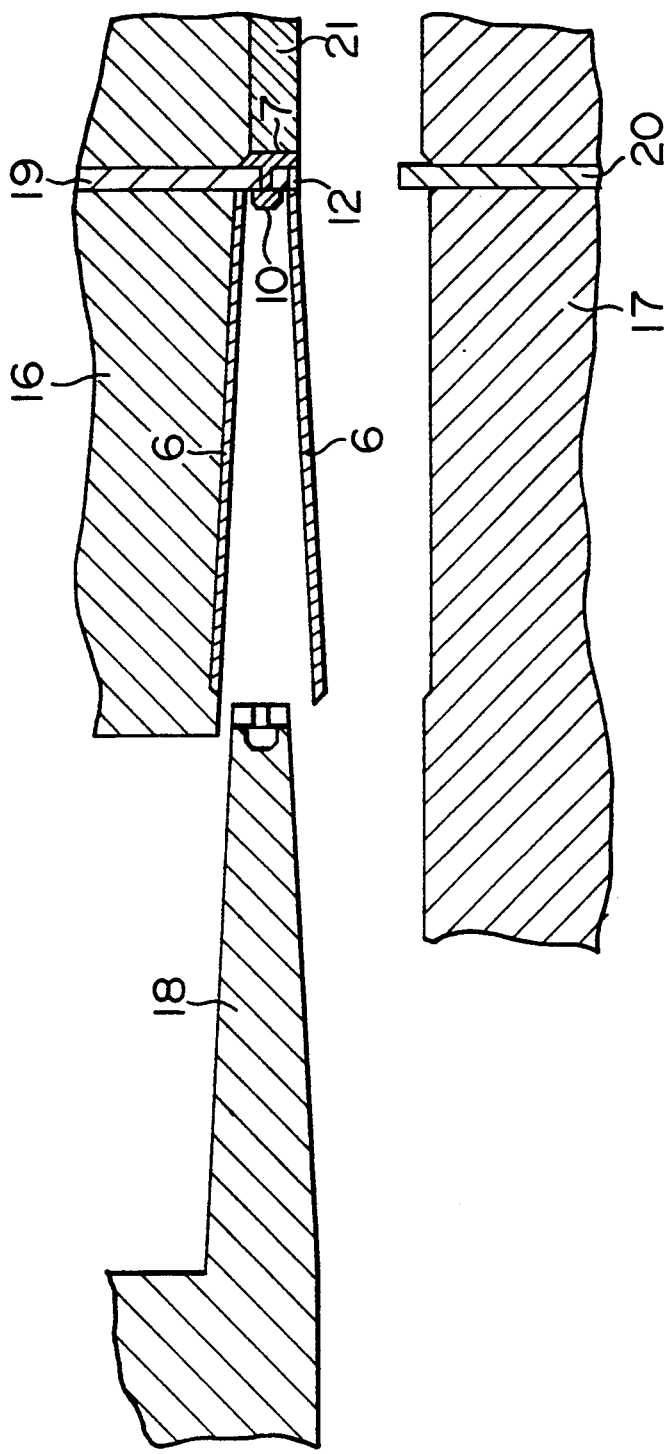
FIG. 11 is a cross-sectional view of a portion of the injection molding apparatus, showing its mold as being opened.

After a dwell step, the mold is opened, and this condition is shown in FIG. 11. At the time of this mold opening, the slide core 18 is moved left relative to the fixed mold member 16 (see FIG. 11), and the movable mold member 17 is retracted from the fixed mold member 16.

Figure 12:
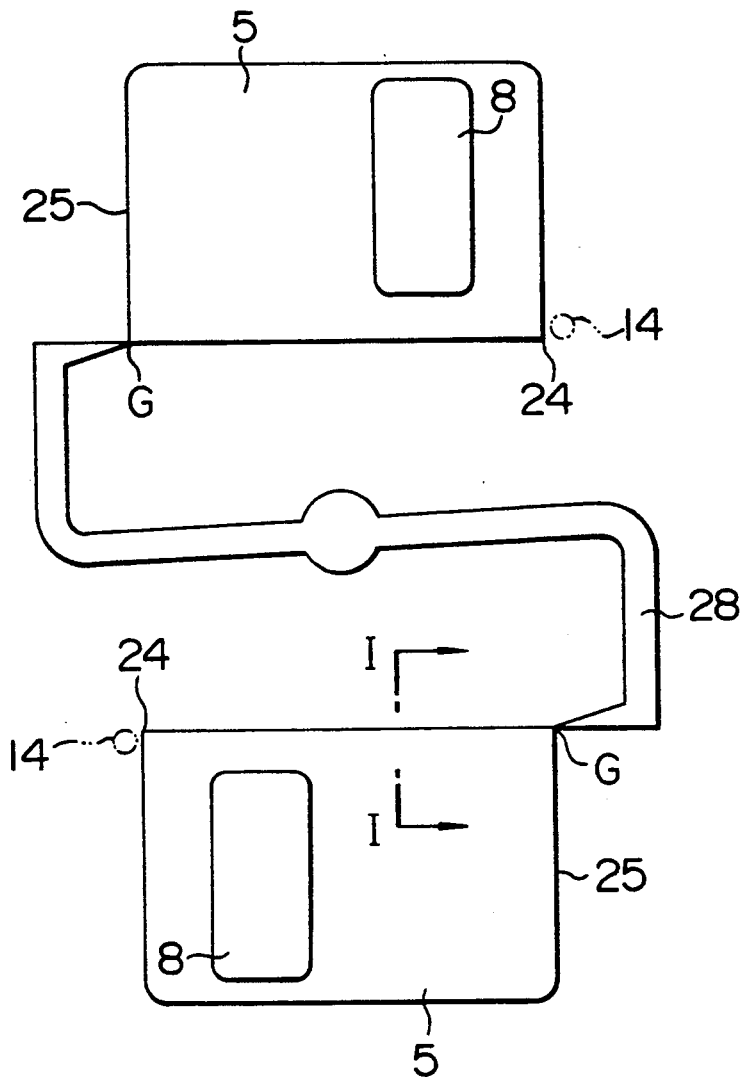
FIG. 12 is a plan view of a two-shot molded shutter produced by the injection molding apparatus.

FIG. 12 is a plan view of a two-shot shutter molded product thus released from the molding apparatus. As shown in FIG. 12, the molded product, molded using the one-point gate and released from the molding apparatus, has two shutters 5 interconnected by a runner 28.

Figure 13:
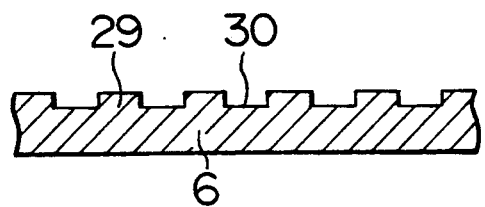
FIG. 13 is an enlarged, cross-sectional view taken along the line I—I of FIG. 12.

FIG. 13 is an enlarged, fragmentary cross-sectional view taken along the line I—I of FIG. 12. In this embodiment, as shown in FIG. 13, alternate projections 29 and grooves 30 are formed on the surface of the flat plate portion 6 from the first end edge 24 toward the second end edge 25.

Figure 14:
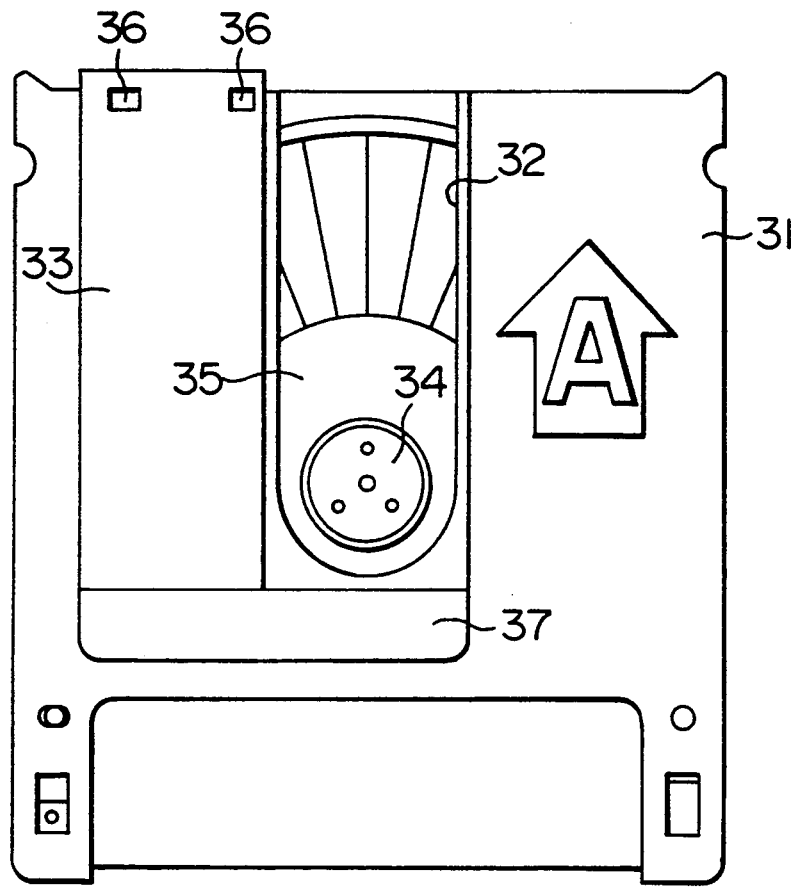
FIG. 14 is a plan view of an optical disk cartridge to which a modified shutter of the present invention is applied.
Figure 15:
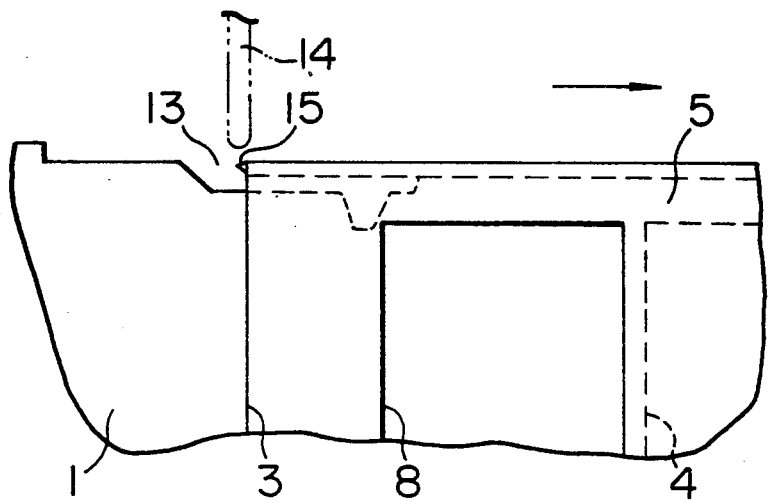
FIG. 15 is a plan view illustrative of an opening movement of a conventional shutter.

FIG. 14 is a plan view of an optical disk cartridge to which a shutter of the present invention is applied.

As shown in FIG. 14, a cartridge case 31 has a slot-like opening 32 constituting both a head insertion hole and a drive shaft insertion hole. The shutter 33 for selectively opening and closing the opening 32 is slidably supported on the cartridge case 31. An optical disk 35 having a hub 34 at its central portion is rotatably housed within the cartridge case 31.

As in the preceding embodiment, the shutter 33 is molded of a synthetic resin, and has a pair of opposed flat plate portions and a connecting plate portion interconnecting the pair of flat plate portions at the edges of the edges of their proximal ends. The thickness T of each flat plate portion increases progressively from its proximal end edge (whose thickness is indicated by T1), disposed adjacent to the connecting plate portion, toward its free or distal end edge (whose thickness is indicated by T2) remote from the connecting plate portion (T1<T2). Also, the thickness of the flat plate portion increases progressively from its one end (whose thickness is indicated by T3) close to the gate trace toward the other end thereof (whose thickness is indicated by T4) remote from the gate trace (T3<T4). Reference numeral 36 denotes an opening formed when forming a projection (not shown) on the shutter 33, and reference numeral 37 denotes a plate slidably holding the free end of the shutter 33.

In the present invention, as described above, the thickness T of each flat plate portion increases progressively from its proximal end edge (whose thickness is indicated by T1), disposed adjacent to the connecting plate portion, toward its free or distal end edge (whose thickness is indicated by T2) (T1<T2), remote from the connecting plate portion. With this construction, the flow of the resin over the entire area of the flat plate portion is uniform so as to prevent a short shot or a void from developing at the free end portion of the flat plate portion, thereby ensuring good moldability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a cartridge having a shutter which is adapted to be mounted on a cartridge case of said cartridge so as to open and close a head insertion hole in said cartridge case housing a recording medium therein, said shutter being made of a synthetic resin and including a pair of opposed flat plate portions and a connecting plate portion interconnecting said pair of flat plate portions at respective proximal edges of said flat plate portions;

the improvement wherein the thickness of each of said flat plate portions increases progressively from said respective proximal edge thereof, disposed adjacent to said connecting plate portion, toward the other or distal edge of said flat plate portion remote from said connecting plate portion.

2. A cartridge according to claim 1, in which a gate trace produced by an injection molding gate is formed adjacent only at one end edge of said connecting plate portion remote from another end edge thereof with which a shutter opening member of a recording and reproducing device is engageable.

3. A cartridge according to claim 2, in which the thickness of each of said flat plate portions increases progressively from one side edge, disposed close to said gate trace, toward that side edge thereof remote from said gate trace.

4. A cartridge according to claim 2, in which each of said flat plate portions has an opening for opening said head insertion hole, and a closure portion for closing said head insertion hole, said closure portion being provided at one side portion of said flat plate portion having said gate trace, and said opening being provided at the other side portion of said flat plate portion remote from said gate trace.

* * * * *